Jan. 25, 1955   D. C. LUDWIG ET AL   2,700,553
FENDER SHIELD WITH WHEEL WELL VENTILATING MEANS
Filed Oct. 14, 1950
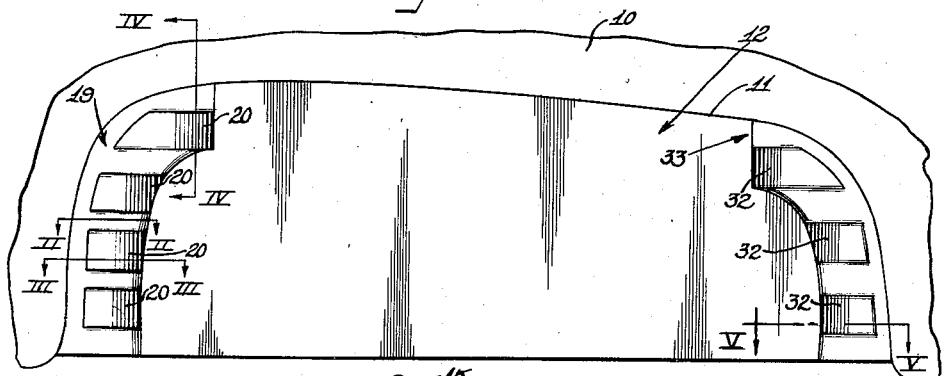
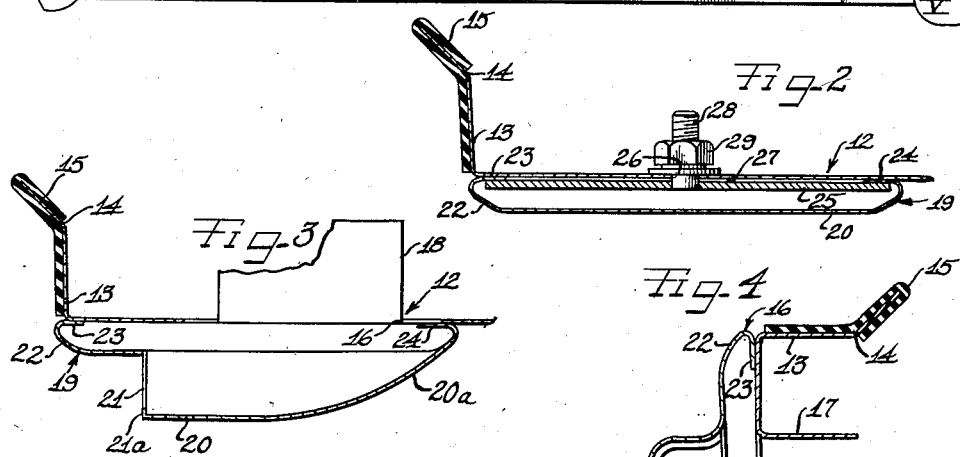
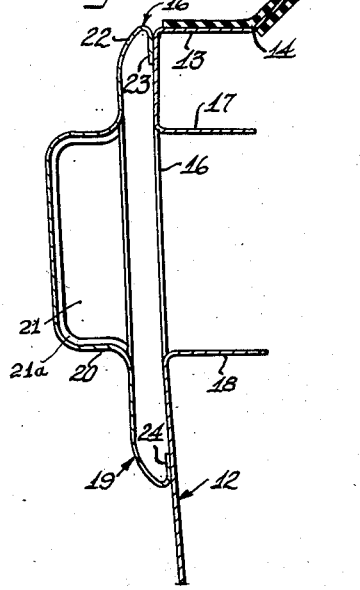
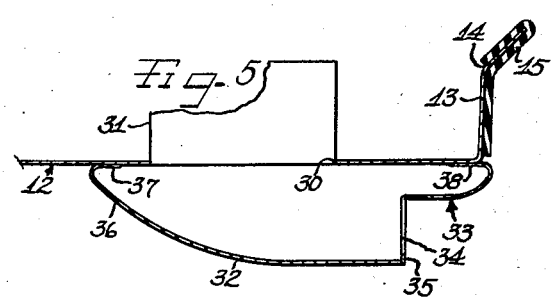
Inventors
George W. Schatzman
Donald C. Ludwig
by  Attys

United States Patent Office 2,700,553
Patented Jan. 25, 1955

2,700,553

FENDER SHIELD WITH WHEEL WELL VENTILATING MEANS

Donald C. Ludwig and George W. Schatzman, Detroit, Mich., assignors to Houdaille-Hershey Corporation, Detroit, Mich., a corporation of Michigan Application October 14, 1950, Serial No. 190,204

14 Claims. (Cl. 280—153)

This invention relates to improvements in fender and fender shield construction, and more particularly to a ventilated fender shield.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axially direction. Since this opening inherently presents a relatively unattractive outward appearance and is at high speed operation a turbulence factor, detachable fender shields have been employed to cover the opening protectively and ornamentally.

However, a fender shield may substantially block off ventilation of the wheel well of the associated vehicle. The wheel well has therein the brake assembly including the brake drum which in service generate considerable heat. To provide for ventilation of the wheel well, a ventilation promoting fender shield is herein provided.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly from the principal body portion of the vehicle.

An important object of the present invention is to provide a novel fender shield assembly having wheel well ventilating means.

Another object of the present invention is to provide a fender shield assembly having novel air intake and exhaust means for ventilation of the associated wheel well.

Another object of the present invention is to provide a fender shield equipped for wheel well ventilation without sacrificing the improved appearance of the wheel access opening closure afforded by the fender shield.

Other objects, features and advantages of the present invention will be readily apparent from the following detailed description of a preferred embodiment thereof taken in conjunction with the accompanying drawings in which:

Figure 1 is a fragmental elevational view of a fender and fender shield assembly embodying the features of the present invention;

Figure 2 is an enlarged horizontal sectional view taken on the line II—II of Figure 1 and showing how the ventilator may be attached to the fender shield;

Figure 3 is an enlarged horizontal sectional view taken on the line III—III of Figure 1 through one of the air scoop louvres of the ventilator;

Figure 4 is an enlarged vertical sectional view taken substantially on the line IV—IV of Figure 1, and Figure 5 is an enlarged horizontal sectional view taken on the line V—V of Figure 1.

In a typical assembly embodying the features of the present invention, a fender 10 which partially encloses a wheel space or well of a vehicle, has a wheel access opening 11 which is closed by a removable fender shield 12. The arrangement and construction of the fender and fender shield are such that the fender shield has the outer surface thereof substantially flush with the outer surface of the fender and provides a closure which as nearly as practicable appears in the final assembly as a part of the fender.

The fender shield 12 is preferably constructed as a panel made from a suitable sheet material, such as sheet metal, and may be formed along its margin with an inturned reinforcing and fender abutment flange 13 having at its inner edge an angularly extending terminal portion 14.

A sealing and rattle preventing joint between the fender and fender shield is afforded by a sealing gasket 15. This gasket member 15 is preferably formed from a flexible resilient material such as rubber or any appropriate rubber substitute and is secured to the fender opposing face of the flange 13 and encompasses the flange terminal portion 14 by being folded thereover.

According to the present invention, means are provided for ventilating the wheel well through the fender shield. For this purpose the fender shield is suitably apertured as by means of one or more apertures 16 preferably located adjacent to the front end of the fender shield 12. The apertures 16 are preferably formed in the fender shield panel by striking out the material thereof. This may be accomplished by splitting the material approximately midway horizontally at each aperture and then bending the material inwardly to provide respective upper and lower flange portions 17 and 18, which reinforce the margins of the apertures 16 respectively defined thereby. Thereby, the fender shield is provided with one or more air passageways therethrough for the diversion of air into the wheel well. The air is received from the slip stream passing the fender shield when the vehicle, with which the fender shield is associated, is in motion.

For effecting positive entry of air into the apertures 16, air scooping and diverting means are provided at the outer side of the fender shield in cooperation with the air entry or ventilation openings 16. For this purpose, an air scoop device 19 may be provided, disposed in overlying relationship to the apertures 16 and including a vertical mutually spaced series of horizontally extending, generally channel-shaped air scoops 20, one of which may be disposed in operative association with each of the openings 16. The air scoops 20 are preferably formed as embossments integrally in one piece in a sheet metal panel from which the air scoops are pressed outwardly, with the ends of the air scoops spaced rearwardly from the forward edge of the body panel 19 having forwardly directed mouths or entrance openings 21 defined by inturned reinforcing and finishing flanges 21a. The air scoops 20 project to maximum extent from the body panel 19 at their forward mouth ends and have the rear portions thereof tapered to blend substantially into the rear edge of the body panel 19 and thereby act to divert air entering the respective air scoops inwardly through the respective ventilation openings 16. The rearward tapering of the air scoops also effects a desirable blending of the rear portion of the air scoop member 19 with the adjacent surface of the fender shield panel to afford a streamlined appearance.

The forward portion of the air scoop member 19 is preferably shaped substantially complementary to the forward end portion of the fender shield panel and the forward margin of the air scoop member is preferably contoured to blend substantially into the margin of the fender shield. For this purpose the scoop member 19 is provided with a generally arcuately tapering forward margin 22.

In order to mount the air scoop member 19 on the fender shield 12, the member 19 is provided with inturned and reversely bent front and rear marginal flanges 23 and 24 which abut the fender shield 12. Suitable clamping means such as a clamping bar 25 (Figure 2) engages the flanges 23 and 24. Apertures 26 and 27 are provided in the ventilator 19 and the fender shield 12, respectively, for receiving suitable fastening means such as a bolt 28 upon the threaded end portion of which a nut 29 is threaded whereby the clamping bar 25 is secured to the fender shield 12.

Instead of or in supplement to the air intake ventilating means, the fender shield 12 may have means for exhausting or venting air from the wheel well through the fender shield. To this end, the fender shield 12, preferably at the rear end portion thereof, is provided with one or more ventilation openings 30 defined by respective horizontally extending reinforcing flanges 31 directed inwardly and comprising material which has been struck out from the openings. The ventilation openings 30 are provided as close as practicable to the rear end margin of the fender shield and thus are as near as practicable to the rear end portion of the wheel well for efficient ventilation of heated air from within the wheel well.

In order to provide for substantial air ejection or suction action of air outwardly through the ventilation openings 30 in the movement of the vehicle, means are provided which project into the slip stream passing the fender shield, and by the action of the slip stream thereby effect substantially a suction movement of air outwardly from within the wheel well through the openings 30 into the slip stream. Herein such means comprise respective ejector flues 32 associated with the openings 30 and by preference comprising pressed out generally channel shaped vertically spaced and horizontally elognated embossment portions of a panel 33 formed from sheet material, such as sheet metal. Each of the flues 32 has a rearwardly opening mouth 34 defined by a reinforcing flange 35. The forward end portion of each of the flues 32 is preferably streamlined by being generally arcuately tapered toward the forward margin of the panel 33 and substantially merging with the outer surface of the fender shield panel 12. Forwardly of the flue mouths 34, the panel 33 is tapered toward its marginal extremity so as substantially to blend into the contour of the margin of the fender shield.

For reinforcing the margin of the panel 33 and for securing the same to the fender shield panel 12, the forward and rear margins of the panel are preferably provided with respective underturned and return bent reinforcing flanges 37 and 38 which may be secured in any appropriate manner to the outer face of the fender shield panel 12, as for example, by using a clamping bar and bolt attaching means similar to the attaching means provided for the front air scoop member 19. For harmonious blending into the fender shield structure, the rear margin of the member 33 may be generally conformed to the rear end margin of the fender shield.

It will thus be apparent that the present invention provides improved fender shield structure equipped for improving air circulation through the wheel well and that this is especially desirable in view of the current trend in automobiles toward low silhouettes with low slung bodies and with the lower edges of the fenders and of the fender shields disposed as low as practicable to the roadway over which the vehicle must travel.

If desired, ventilation may be effected only by diverting air in through the fender shield. On the other hand, ventilation may be promoted only by exhausting air out through the fender shield. However, greatly increased ventilation can be effected by promoting intake of air at the forward portion of the fender shield into the wheel well and expulsion or venting of air at the rear end portion of the fender shield, as provided by the present invention.

It will be understood that modifications and variations may be effected without departing from the scope of the novel concepts of the present invention.

We claim as our invention:

1. In a fender shield assembly, a fender shield panel having ventilation opening therethrough, and air scoop means on said panel comprising a vertical series of horizontally disposed channel-shaped air scoop sections having forward end openings and constructed to direct air inwardly through said panel.

2. A fender shield having a vertically spaced series of openings therein, and a series of longitudinally disposed channel-shaped sections secured on said fender shield in overlying relation to said openings and having openings at the forward ends thereof for promoting ventilation through said openings.

3. In a fender shield assembly, a fender shield, a forward air scoop ventilator on said fender shield having openings at the forward end of said fender shield for drawing air in, and a rear air scoop ventilator on said fender shield having openings on the rear end of said fender shield for drawing air out.

4. In a fender shield combination, a fender shield having a forward and a rearward opening therein, a forward air scoop ventilation means on said fender shield comprising an air channel disposed in overlying relationship to said forward opening to direct air to flow thereinto, and a rear air flue on said fender shield comprising an air channel disposed in overlying relationship to said rear opening and affording an air vent.

5. In a fender shield combination, a fender shield having forward and rear openings therein, a forward air scoop ventilator on said fender shield comprising a series of longitudinally disposed channel-shaped sections having openings at the forward ends thereof to promote air flow through said forward openings, and a rear air flue ventilator on said fender shield comprising a series of longitudinally disposed channel-shaped sections having openings at the rear ends thereof to promote air flow through said rear openings.

6. In a fender shield assembly, a fender shield having an opening therein, and an air scoop ventilator panel mounted on said fender shield comprising a panel of sheet material having an integrally pressed air channel structure disposed in overlying relationship to said opening for promoting ventilation through said opening.

7. In combination, a fender shield having an opening therein, an air promoting ventilator for promoting air flow through said opening, flanges on said ventilator abutting said fender shield adjacent to said opening, an attachment bar positioned on said flanges, and means securing said bar to said fender shield whereby said ventilator is mounted to said fender shield.

8. A fender shield comprising a panel having an opening therein, and a ventilator member comprising a panel secured to the fender shield panel and having an air flow promoting elongated embossment thereon opening outwardly from the panel at one end of the embossment and substantially merging with the ventilator panel at the opposite end of the embossment.

9. In a ventilator panel structure for application to the outer side of a fender shield panel having an opening therein, said ventilator panel comprising a panel body formed from sheet material and having the margins thereon turned under in reinforcing relation to the body, and a channel shaped air passage embossment on the ventilator panel having a mouth adjacent one margin of the panel, said mouth being directed toward said one margin and having a reinforcemet thereabout, the opposite end of said embossment substantially merging with the opposite margin of the ventilator panel.

10. In combination in a fender shield construction, a fender shield panel having an end portion adapted to be disposed in closing relation to one end portion of a wheel access opening in a fender for substantially closing the wheel well defined by the fender, said end portion of the fender shield having ventilation opening therethrough, and a member substantially concealing said opening and having a margin substantially conforming to the margin of said end portion of the fender shield, said member having an air channel opening toward said one margin and substantially merging with the panel in that portion of the channel remote from said opening.

11. A fender shield construction comprising a panel for substantially closing a wheel access opening in a fender, said panel having front and rear ends, the rear end portion of the panel having a ventilation opening therethrough, and means at said opening for promoting movement of air from behind the panel outwardly.

12. A fender shield construction comprising a generally elongated and vertically mountable panel for substantially closing a wheel access opening in an automobile fender, said panel having front and rear portions and a marginal inturned reinforcing flange cooperative with the margin defining the wheel access opening in a fender, the front portion of the panel having an air inlet opening therethrough, and means at said opening for scooping slip stream air and diverting such air into said opening to the inner side of the panel in the forward movement of the panel in service on a fender.

13. A fender shield construction as defined in claim 12, wherein said means comprises a panel in overlying and concealing relation to said opening and provided with a louver projection having a forwardly directed opening.

14. In a fender shield construction, a panel for substantially closing a wheel access opening in a fender, said panel having front and rear end portions, the front end portion of the panel having an air opening therethrough, means at said air opening for promoting movement of air from the front of the panel inwardly, the rear end portion of the panel having a ventilation opening therethrough, and means at said ventilation opening for promoting movement of air from inside the panel outwardly.

References Cited in the file of this patent

UNITED STATES PATENTS

| | | |
|---|---|---|
| 778,455 | Lewis | Dec. 27, 1904 |
| 1,539,534 | Ansell | May 26, 1925 |
| 2,127,409 | Klavik | Aug. 16, 1938 |
| 2,199,316 | Klavik | Apr. 30, 1940 |
| 2,218,626 | Snyder | Oct. 22, 1940 |
| 2,220,587 | Strobell | Nov. 5, 1940 |
| 2,222,624 | Mills | Nov. 26, 1940 |
| 2,562,103 | Kline | July 24, 1951 |

FOREIGN PATENTS

| | | |
|---|---|---|
| 890,806 | France | Nov. 19, 1943 |